(12) United States Patent
Glasberg et al.

(10) Patent No.: US 9,821,514 B2
(45) Date of Patent: *Nov. 21, 2017

(54) METHOD AND APPARATUS IN THE MANUFACTURE OF A SPIRALLY WOUND AND WELDED TUBE

(71) Applicant: UPONOR INFRA OY, Vantaa (FI)

(72) Inventors: Christian Glasberg, Vaasa (FI); Kari Karjalainen, Vaasa (FI); Sven Sjöberg, Vaasa (FI)

(73) Assignee: UPONOR INFRA OY, Vantaa (FI)

( * ) Notice: Subject to any disclaimer, the term of this patent is extended or adjusted under 35 U.S.C. 154(b) by 299 days.

This patent is subject to a terminal disclaimer.

(21) Appl. No.: 14/440,256

(22) PCT Filed: Nov. 19, 2013

(86) PCT No.: PCT/FI2013/051082
§ 371 (c)(1),
(2) Date: May 1, 2015

(87) PCT Pub. No.: WO2014/080076
PCT Pub. Date: May 30, 2014

(65) Prior Publication Data
US 2015/0314525 A1 Nov. 5, 2015

(30) Foreign Application Priority Data

Nov. 20, 2012 (FI) ...................................... 20126219

(51) Int. Cl.
*B29C 53/82* (2006.01)
*B29C 65/00* (2006.01)
(Continued)

(52) U.S. Cl.
CPC ...... *B29C 66/4329* (2013.01); *B29C 47/0023* (2013.01); *B29C 53/78* (2013.01);
(Continued)

(58) Field of Classification Search
CPC ............. B29C 53/827; B29C 66/83411; B29C 66/9221; B29C 66/92431; B29C 66/9261; B29C 66/961; F16L 9/16
See application file for complete search history.

(56) References Cited

U.S. PATENT DOCUMENTS 3,861,984 A 1/1975 Poulsen
3,914,151 A 10/1975 Poulsen
(Continued)

FOREIGN PATENT DOCUMENTS

EP 0 714 346 A1 6/1996
EP 0 714 346 B1 10/1998
(Continued)

OTHER PUBLICATIONS

Supplementary European Search Report issued in corresponding Application No. 13 85 7213 dated Jul. 26, 2016 (in English).
International Search Report, issued in PCT/FI2013/051082, dated Feb. 21, 2014.
(Continued)

*Primary Examiner* — Carson Gross
(74) *Attorney, Agent, or Firm* — Birch, Stewart, Kolasch & Birch, LLP

(57) ABSTRACT

A method and apparatus in the manufacture of a spirally wound and welded tube is disclosed. A thermoplastic profile is slid along a path on a slider arranged in an axial direction of the tube and defining a cylindrically shaped winding surface with a diameter corresponding to the inner diameter of the tube to be manufactured. The profile is directed along a spiral path towards a previous turn of said profile by means of radial rollers spaced along said spiral path by adjusting the position of the rollers: Opposite edges of said profile turns are welded together by providing an extruded welding mass between said profile turns. The welded tube is fed from the welding station by means the rollers by sliding it onto a rotating support.

8 Claims, 4 Drawing Sheets

(51) Int. Cl.
    *B29C 53/78*        (2006.01)
    *F16L 9/16*         (2006.01)
    *F16L 9/12*         (2006.01)
    *B29C 65/40*        (2006.01)
    *B29C 47/00*        (2006.01)
    *B29K 101/12*      (2006.01)
    *B29L 24/00*       (2006.01)
    *B29L 23/00*       (2006.01)

(52) U.S. Cl.
    CPC .......... *B29C 65/40* (2013.01); *B29C 66/1122* (2013.01); *B29C 66/232* (2013.01); *B29C 66/345* (2013.01); *B29C 66/524* (2013.01); *B29C 66/63* (2013.01); *B29C 66/73921* (2013.01); *B29C 66/81465* (2013.01); *B29C 66/83411* (2013.01); *B29C 66/9221* (2013.01); *B29C 66/9261* (2013.01); *B29C 66/92431* (2013.01); *B29C 66/961* (2013.01); *F16L 9/12* (2013.01); *F16L 9/16* (2013.01); *B29C 53/82* (2013.01); *B29C 53/827* (2013.01); *B29K 2101/12* (2013.01); *B29L 2023/22* (2013.01); *B29L 2024/00* (2013.01)

(56) References Cited

U.S. PATENT DOCUMENTS

| | | | |
|---|---|---|---|
| 3,917,500 | A | 11/1975 | Petzetakis et al. |
| 4,033,808 | A | 7/1977 | Petzetakis |
| 5,591,292 | A * | 1/1997 | Blomqvist ........ B29C 66/83411 156/244.13 |
| 6,105,649 | A * | 8/2000 | Levingston ............. B29C 53/78 156/425 |
| 6,939,424 | B1 * | 9/2005 | Takala ................ B29C 53/8091 156/191 |

FOREIGN PATENT DOCUMENTS

| | | |
|---|---|---|
| EP | 1 237 708 B1 | 10/2005 |
| WO | WO 99/20457 A1 | 4/1999 |
| WO | WO 00/17564 A1 | 3/2000 |
| WO | WO 00/18563 A1 | 4/2000 |

OTHER PUBLICATIONS

Written Opinion of the International Searching Authority, issued in PCT/FI2013/051082, dated Feb. 21, 2014.

* cited by examiner

METHOD AND APPARATUS IN THE MANUFACTURE OF A SPIRALLY WOUND AND WELDED TUBE

The present invention relates to a method and apparatus in the manufacture of a spirally wound and welded tube. Welded, spirally wound tubes of the kind now in question, are shown in European Patents No. 714346 and 1237708. There a simple and reliable welding is done in one operation from the outside with one extruder.

Requirements for good weld seams in thermoplastic materials includes that the surfaces to be welded are evenly heated to a correct temperature, and that the surfaces to be welded together are pressed towards each other.

In these prior solutions, welding has been carried out by means of a drum rotating along its entire length around which a thermoplastic profile is wound and on which the welding is performed. The weld joint on the outer surface of the tube is smoothed when the tube lies against the drum. This is done by allowing a stationary smoothing body to lie against and slide along the heated weld joint during the rotary motion of the tube. The weld joint inside the tube has been formed against the rotating drum, as in EP 714346, or both the inner as well as the outer weld joint are smoothed by means of extra heat and stationary bodies lying against the weld joint, as in EP 123770.

The prior solutions have solved the problem with applying the welding mass and smoothing the weld seam surfaces reasonably well. However, controlling the forces with which the profiles to be welded are pulled and seamed together has been difficult, as this is mainly done by controlling the temperature of the profile and thereby the friction of it against the drum. Especially heating and seam smoothing from the inside of the tube has been a problem, as the tube is wound on an essentially solid drum.

The purpose of this invention is to provide an improved method and apparatus for controlling the formation of the weld seam. The inventive method includes the steps of:

receiving a thermoplastic profile with a substantially rectangular cross-section on sliding means arranged in an axial direction of said tube and defining a cylindrically shaped winding surface with a diameter corresponding to the inner diameter of the tube to be manufactured;

directing the received profile along a spiral path on said sliding means towards a previous turn of said profile on said cylindrical surface by means of radially oriented rollers spaced along said spiral path by adjusting the axial position of said radially arranged rollers along said spiral path;

welding together opposite edges of said profile turns at a welding station by providing an extruded welding mass between said profile turns and by pressing them together;

forwarding said tube in an axial direction by means of said rollers by sliding it onto a rotating support.

In one preferred embodiment of the inventive method the axial position of each roller is shifted in response to a force gauge giving an indication of the need of an axial position adjustment and its magnitude.

In a further preferred embodiment of the inventive method the radial rollers and axial sliding means are moved as units along radial extensions of a star-like framework of said welding apparatus, in order to form tubes of different diameters.

The inventive apparatus includes:

sliding means arranged in an axial direction of said tube and defining a cylindrically shaped winding surface for receiving a thermoplastic profile, said winding surface having a diameter corresponding to the inner diameter of the tube to be manufactured;

rollers protruding in an essentially radial direction along said winding surface, to form a spiral path to direct the received profile towards a previously wound turn of said profile, said rollers being provided with means for adjusting their axial positions along said spiral path;

a welding station arranged to receive an extruded welding mass and to deliver said mass to at least one of the opposite edges of said profile turns;

means for pressing said profile turns to be welded together, and forwarding means arranged to receive and rotate said tube in order to move said tube in an axial direction away from said sliding means.

A preferred embodiment of the inventive apparatus have adjusting means arranged to shift the axial position of each roller, and includes a force gauge at said adjusting means to indicate the need of an axial position adjustment and its magnitude. Preferably, the radial rollers and axial sliding means are built as a unit comprising two axial rotating steel rollers and one radial rotating roller.

A further preferred embodiment of the inventive apparatus have the above mentioned units arranged on radial extensions of a star-like framework of said welding apparatus, and includes adjusting means to make the units movable along said extensions to form tubes of different diameters.

The invention is next described in more detail with reference to the accompanying drawings, wherein.

Figure 1:
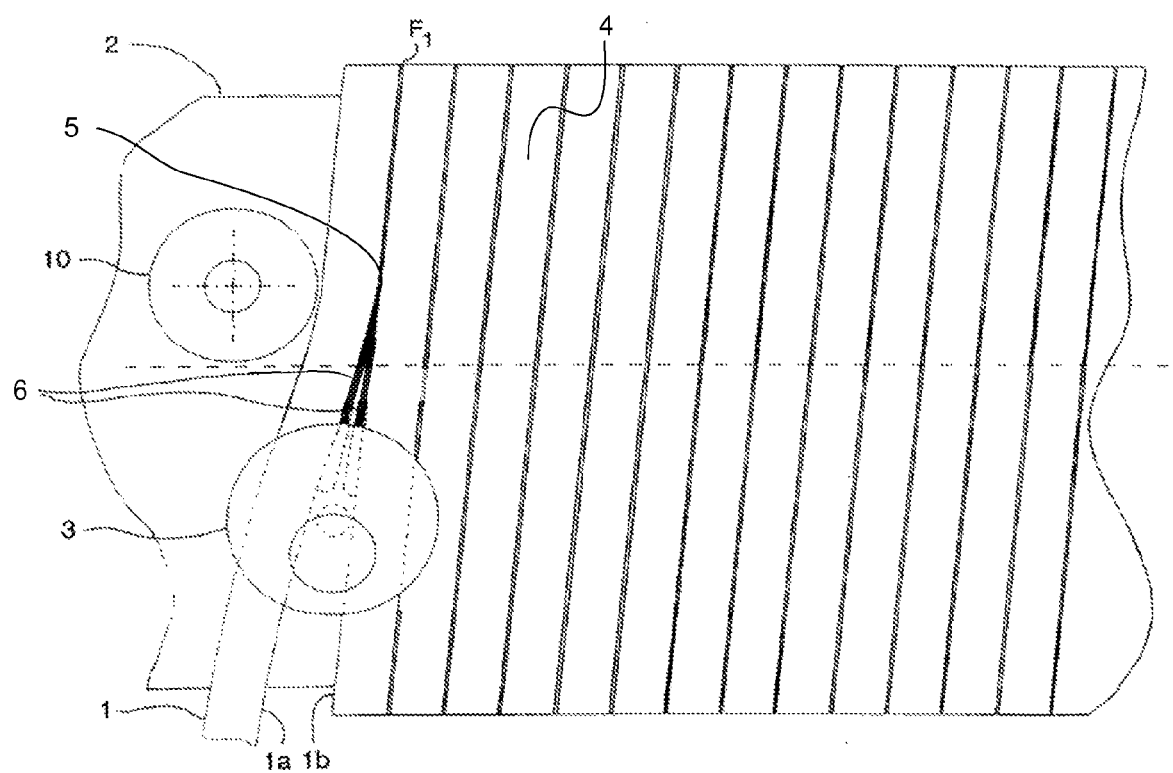
FIG. 1 shows a scheme in principle of the manufacture of a spirally wound tube as known in the art.

Referring to the prior art apparatus of FIG. 1, a spirally wound tube 4 is manufactured of a thermoplastic profile 1 with a mainly rectangular cross-section. The profile 1 is led to a rotatable welding drum 2, with a diameter corresponding to the inner diameter on the tube 4 to be manufactured. The profile 1 is wound in a spiral or screw-like movement around the welding drum 2, as shown.

A welding head 3 is placed in the wedge-like gap or welding area formed between two turns of the profile 1, one entering the welding drum and the other wound around the welding drum 2 a first turn. The welding head 3 is connected to an extruder (not shown), producing a welding mass 6. The welding mass 6 forms an outer weld seam 5 and/or an inner weld seam 7 (see FIG. 2). The feed and properties of the welding mass 6 is naturally regulated with the extruder.

The opposite edge portions 1a, 1b of the profile 1 carrying extruded strings of the welding mass 6, are pressed together by means of one or more rollers 10. The axis of the rollers 10 are radially oriented relative to the welding drum 2 and tube 4. The correct force the roller 10 should apply on profile 1 is depending on the tension of the profile and the friction between the profile 1 and the welding drum 2. By controlling the temperature of the profile 1, the wound profile will shrink more or less, which results in a higher or lower friction against the drum 2, and a higher or lesser tension in the profile 1 itself. The rollers 10 act as a seaming means, by pressing the profile edges 1a and 1b gradually towards each other until they are seamed together to complete the welding operation. The pipe 4 is then pushed onwards to the right, to the next manufacturing or transportation step.

Figure 2:
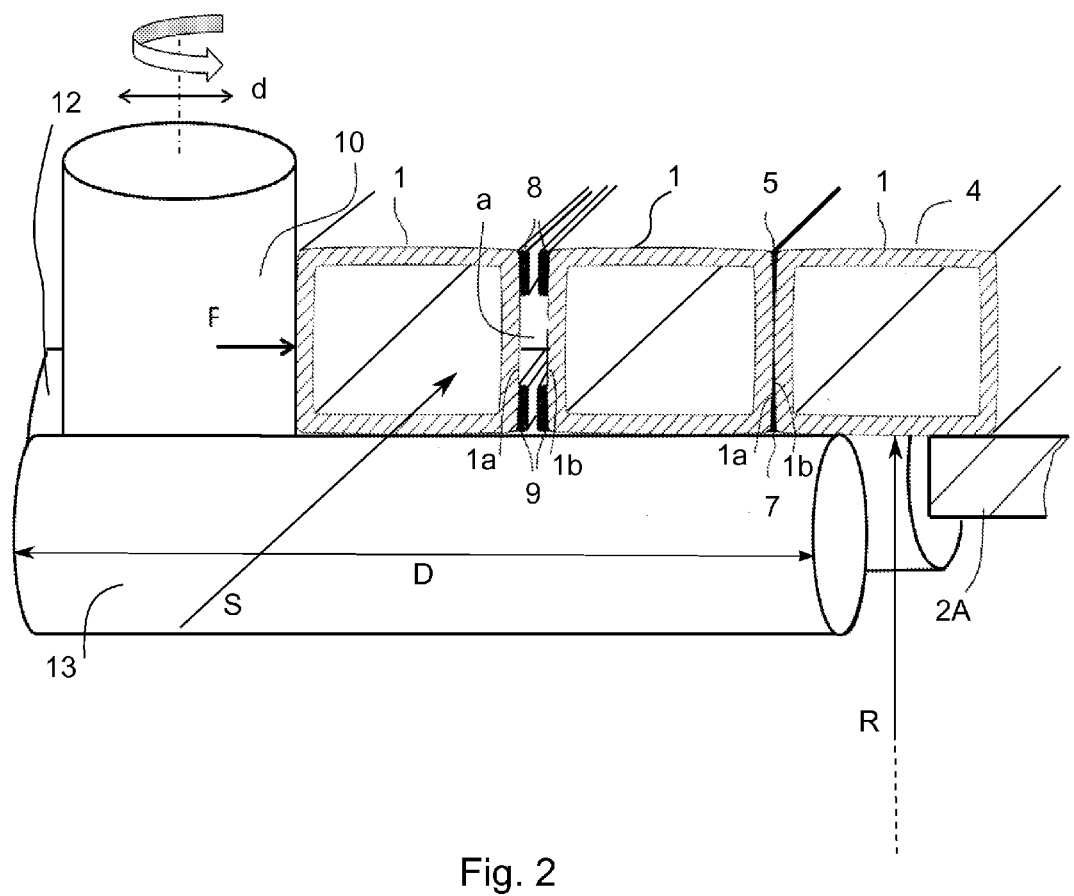
FIG. 2 shows the function of a roller unit according to the present invention.

FIG. 2 shows the basic winding and welding apparatus according to one embodiment of the invention. Here, the drum 2 of FIG. 1 has been replaced by a multitude of rollers and sliding bars, the operation of which will be explained hereinafter. Instead of the solid drum 2 of FIG. 1, there is now in place a winding apparatus having a relatively open structure of sliding bars 12 and 13, which offers many advantages. One of these advantages is that guiding, heating and smoothing of the profile and the weld seam is now much easier, also from the inside. After welding, the tube 4 is slided onto a rotating drum 2A for the next manufacturing or transportation step. The sliding bars 12,13 are arranged in an axial direction of the tube and defines, by their length D and radius R, a cylindrical surface with a diameter generally corresponding to the inner diameter of the tube to be manufactured. The thermoplastic profile 1 having a substantially rectangular cross-section are winded up on the sliding bars 12, 13 and directed along the spiral path S (see also FIG. 3) on the bars 12, 13 towards a previous turn of the profile by means of rollers 10. The rollers are adjustably (arrow d) spaced along the spiral path so that the position of all rollers 10 so adjusted defines the desired spiral path S.

In the gap "a" to the left between the profile 1 is shown welding mass strings 8 and 9 applied by an extruder (not shown) along preferably preheated upper and lower edge portions of the two profile surfaces 1a and 1b. The exact position in the winding operation where the strings 8 and 9 are applied is not a critical factor with regard to the present invention, as long as gap "a" is wide enough to receive the strings. This can be done anywhere along the path formed by the sliding bars 12 and 13, or even before the profile enters in contact with the bars. On the profile's next turn to the right, the gap is closed, and upper and lower weld seams 5 and 7 have been formed. The welding mass strings can within the scope of invention be applied in any desired configuration, e.g. only one string on each profile (one stream 8 and one stream 9), or only one string, e.g. between the shown strings 8 or 9 on profile 1.

The force F applied by the roller 10 on the profile is according to the present invention controlled by adjusting the distance d of the roller 10 from the profile 1, as shown in the figure. Finally, the weld seams 5 and/or 7 may immediately after welding be smoothed out by means of a sliding shoe (not shown) or the like located against the surfaces of the welded seams. In this embodiment of the invention, the sliding bars 12 and 13 are stationary while a rotating drum 2A pulls the welded profile off the bars and transports the pipe 4 to the next manufacturing step. The rotating drum 2A supporting and forwarding the tube 4 can be of any mechanical construction. Also, the sliding bars 12 and 13 may rotate around their longitudinal axis.

Figure 3:
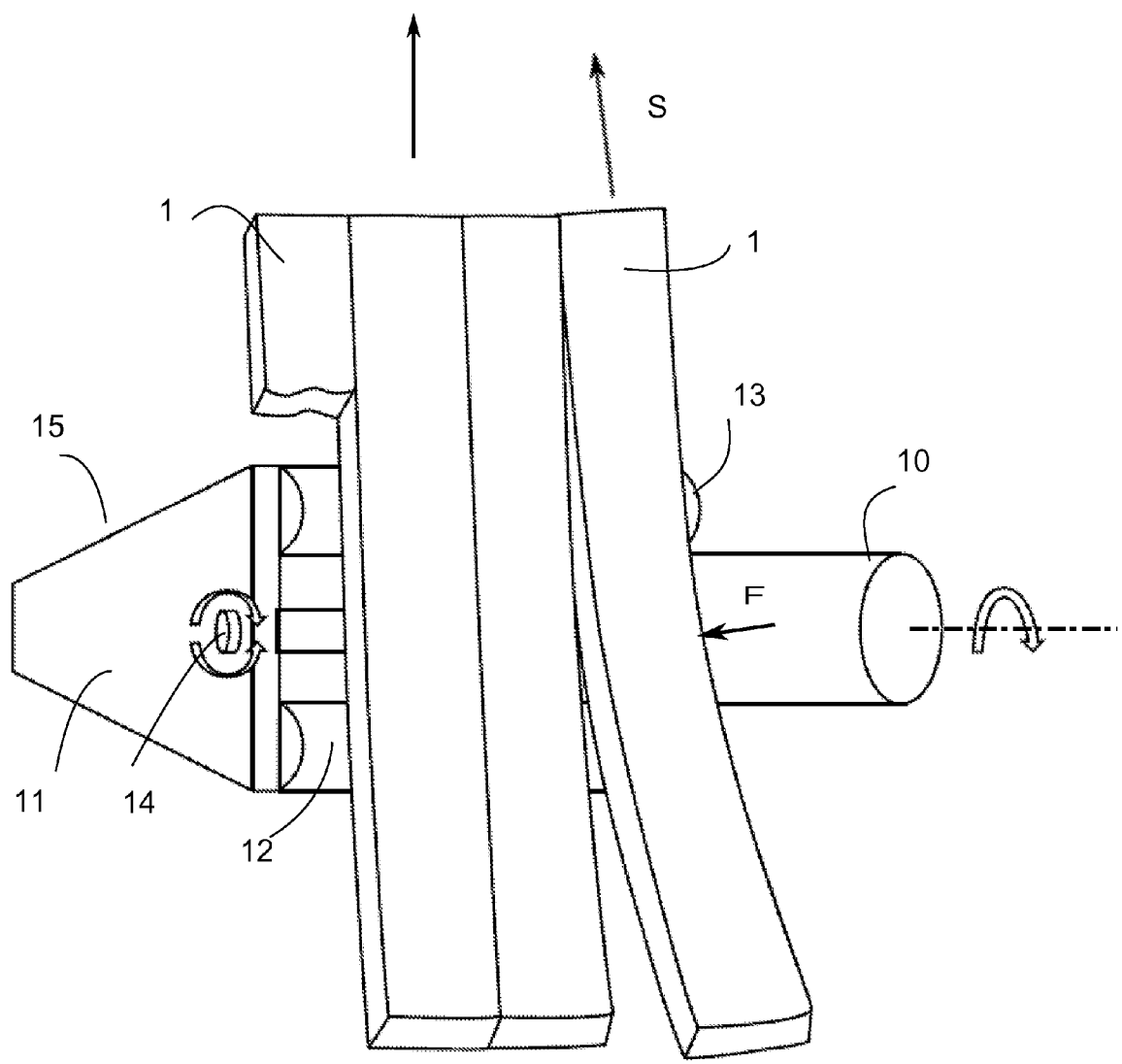
FIG. 3 shows the construction of a roller unit according to another embodiment of the present invention.
Figure 4:
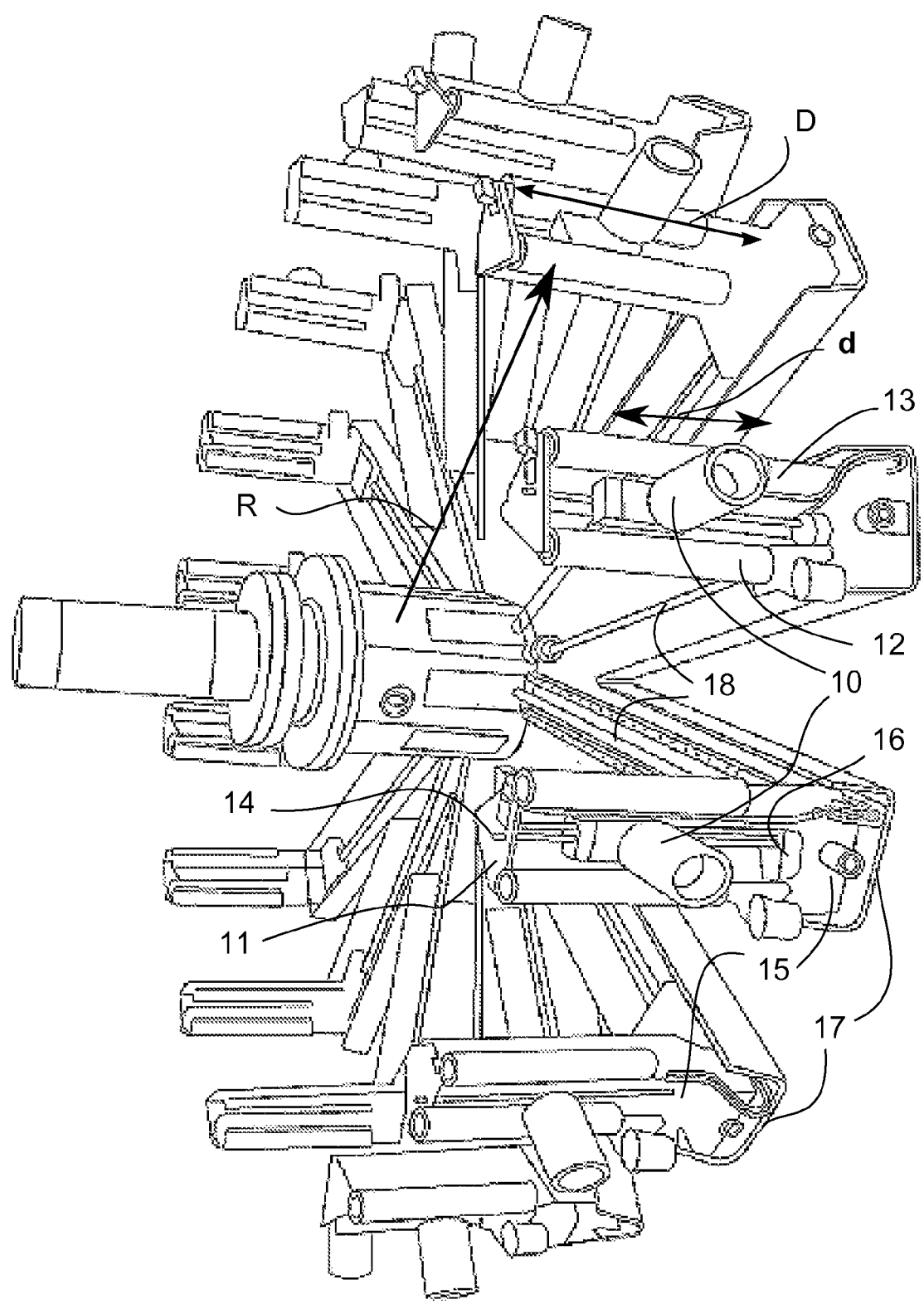
FIG. 4 shows an overview of a welding apparatus according to the present invention.

Turning now to FIG. 3, there is shown an embodiment of the present invention, in which the roller 10 has been built into a unit generally denoted by the reference number 15. In the unit, roller 10 directs the profile 1 along an inclined spiral path S during its first turn on the welding apparatus. Attached to bracket 11 are sliding bars 12 and 13 and an adjustment rod 14 for the roller 10. By turning the adjustment rod 14 in either direction as shown by the arrows, the roller 10 is shifted to narrow or widen the gap between the two most recent turns of the profile 1 (gap a in FIG. 2), with the intention to keep the force F as applied on the profile 1 constant at each roller 10. The initial adjustment may be to have an equal axial displacement between every unit 15 and its roller 10, in order to make the path for the profile entering the welding apparatus as smooth as possible. The distance $L_r$ for each roller "r", counted from the first roller where the winding operation of the profile 1 starts, is $L_r = n_r \times S/N$, where n is the order number of the roller, S is the width (mm) of the profile 1, and N is the total number of rollers 10. In the example of FIG. 4 N=16.

It is to be noted that even if the already welded profiles 1 in FIG. 3 seem to run perpendicular to the sliding bars 12 and 13, there is of course always an inclination like the one in FIG. 1.

During welding operation, a force sensor (see FIG. 4) at one end of the adjustment rod 14 feels the force F applied at each roller 10. Any deviations from a desired value are thus detected, and any adjustment of the roller position(s) can be made manually at each roller unit, based on an individual force value displayed, or centrally and/or automatically at the control panel of the welding apparatus (not shown).

The roller units 15 are according to the invention arranged circumferentially along the periphery of the tube to be manufactured. In the example of FIG. 4, sixteen units are arranged in a circular fashion at equal spaces on radial extensions 17 in a star-like fashion. As can be seen, each unit 15 has a roller 10 which position is adjustable along arrow d (see also FIG. 2).

Bracket 11 has bearing points for the sliding bars 12, 13 and adjustment rod 14. Additionally, the position of the force sensor 16 is marked. Also the length D and radius R of the sliding bars 12 and 13 are shown. They define, as discussed in connection with FIG. 2, the cylindrically shaped surface on which the tube can be manufactured.

An advantage in connection with the inventive welding method and apparatus is the fact that the welding is performed on a roller structure and not a closed drum or cylinder. Thus there is plenty of space to accommodate the welding mass extruder head, various heating means for heating the profile parts to be welded, for using seam smoothing means also inside the tube, and for the roller structure itself. The heating means may include hot air blowers and infrared warmers like LEISTER and INFRA, respectively, the seam smoothing means may include adjustable pressure shoes made of PTFE or similar plastics material with a low friction coefficient, see e.g. EP 1237708. These auxiliary devices are as such well known in industry, and one with ordinary skill in the art can readily apply and use them to reach satisfactory welding results.

Also, it is clear that the welded tube 4 may within the scope of the present invention be transferred from the roller units of FIG. 4 onto a rotating traditional drum like the drum 2 in FIG. 2 for further transport to treatment, cutting and storing operations, or to a construction similar to the one in FIG. 4, where the tube is turned and supported by rollers or the like, or to a combination of both. Also, as can be seen from FIG. 4, each roller unit 15 on its radial extensions 17 can be slided along an axis or bar 18 in order to alter the diameter of the tube 4 to be formed.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method in the manufacture of a spirally wound and welded tube including the steps of:
   receiving a thermoplastic profile with a substantially rectangular cross-section on a slider arranged in an axial direction of said tube and defining a cylindrically shaped winding surface with a diameter corresponding to the inner diameter of the tube to be manufactured;
   directing the received profile along a spiral path on said slider towards a previous turn of said profile on said cylindrical surface by means of radially arranged rollers spaced along said spiral path by adjusting the axial position of said radially arranged rollers along said spiral path;
   welding together opposite edges of said profile turns at a welding station by providing an extruded welding mass between said profile turns and by pressing them together; and
   forwarding said tube in an axial direction by means of said rollers by sliding it onto a rotating support;
   wherein the axial position of each roller is shifted in response to a force gauge giving an indication of the need of an axial position adjustment and its magnitude.

2. The method according to claim 1, wherein said radially arranged rollers and said slider are moved as units along radial extensions of a star-like framework of a welding apparatus, in order to form tubes of different diameters.

3. The method according to claim 1, wherein said radially arranged rollers and said slider are moved as units along radial extensions of a star-like framework of a welding apparatus, in order to form tubes of different diameters.

4. An apparatus for manufacturing a spirally wound and welded tube, including:
   a slider arranged in an axial direction of said tube and defining a cylindrically shaped winding surface for receiving a thermoplastic profile, said winding surface having a diameter corresponding to the inner diameter of the tube to be manufactured;
   rollers being provided with an adjusting mechanism configured to adjust their axial positions along said spiral path;
   a welding station arranged to receive an extruded welding mass and to deliver said mass to at least one of opposite edges of profile turns;
   a pressing device configured to press said profile turns to be welded together; and
   a forwarding device arranged to receive and rotate said tube in order to move said tube in an axial direction away from said slider;
   wherein the axial position of each roller is shifted in response to a force gauge giving an indication of the need of an axial position adjustment and its magnitude.

5. The apparatus according to claim 4, where said adjusting mechanism is arranged to shift the axial position of each roller, and including a force gauge at said adjusting mechanism to indicate the need of an axial position adjustment and its magnitude.

6. The apparatus according to claim 5, wherein said rollers and a sliding means are built as a unit comprising two axial rotating steel rollers and one radial rotating roller.

7. The apparatus according to claim 4, wherein said rollers and slider are built as a unit comprising two axial rotating steel rollers and one radial rotating roller.

8. The apparatus according to claim 7, wherein said units are arranged on radial extensions of a star-like framework of a welding apparatus, said extensions having the adjusting mechanism to make said units movable along said extensions to form tubes of different diameters.

* * * * *